US005697826A

United States Patent [19]

Kim et al.

[11] Patent Number: 5,697,826

[45] Date of Patent: Dec. 16, 1997

[54] TRANSMISSION MODE PHOTOCATHODE SENSITIVE TO ULTRAVIOLET LIGHT

[75] Inventors: Hyo-Sup Kim, Phoenix; John Frederick Krueger, Chandler; Alexander Lackey Vimson, Apache Junction, all of Ariz.

[73] Assignee: Litton Systems, Inc., Woodland Hills, Calif.

[21] Appl. No.: 677,269

[22] Filed: Jul. 9, 1996

Related U.S. Application Data

[62] Division of Ser. No. 281,850, Jul. 28, 1994, Pat. No. 5,557,167.

[51] Int. Cl.$^6$ ........ G02B 5/28

[52] U.S. Cl. ........ 445/58

[58] Field of Search ........ 445/58, 59; 257/11, 257/17

[56] References Cited

U.S. PATENT DOCUMENTS

| | | | |
|---|---|---|---|
| 4,286,373 | 9/1981 | Gutirrez et al. | 313/346 R |
| 4,616,248 | 10/1986 | Khan et al. | 257/11 |
| 5,182,670 | 1/1993 | Khan et al. | 257/17 |
| 5,268,570 | 12/1993 | Kim et al. | 313/527 |

FOREIGN PATENT DOCUMENTS 63-291337 11/1988 Japan .

*Primary Examiner*—Kenneth J. Ramsey

[57] ABSTRACT

A photocathode which is responsive to ultraviolet light to release photoelectrons includes a supportive window layer of sapphire and a single-crystal active layer of AlGaN. Interposed between the window layer and the active layer is an interface layer which insures a low population density of crystalline defects at the interface of the interface layer with the active layer and in the active layer itself. Consequently, the photocathode is an effective emitter of photoelectrons in the transmission mode.

30 Claims, 4 Drawing Sheets

TRANSMISSION MODE PHOTOCATHODE SENSITIVE TO ULTRAVIOLET LIGHT

This is a divisional of application Ser. No. 08/281,850 filed on Jul. 28, 1994, now U.S. Pat. No. 5,557,167.

BACKGROUND OF THE INVENTION

1. Field of the Invention

This invention is in the field of photocathodes which are responsive to light in the ultraviolet (uv) spectral range to release photoelectrons. The photoelectrons may be amplified or multiplied by conventional devices to provide, for example, a current indicative of a uv light flux, or to produce an image of the uv light source or of an object illuminated with uv light. The present photocathode is based on $Al_xGa_{1-x}N$.

2. Related Technology

A conventional photocathode based on $Al_xGa_{1-x}N$ is known in accord with U.S. Pat. No. 4,616,248, issued 7 Oct. 1986 to Messrs. Khan and Schulze. The '248 patent is believed to teach a transmission mode photocathode including a sapphire substrate upon which an $Al_xGa_{1-x}N$ active layer is epitaxially grown, either directly or with an intervening buffer layer of $Al_yGa_{1-y}N$, with y>x so that the buffer layer is transparent to the uv light to be detected. The '248 patent teaches that the active layer should be activated at its electron-emitting surface with Cs to provide a negative electron affinity layer.

However, it is believed that the '248 patent cannot provide a transmission mode photocathode with a desirably high sensitivity to uv light because five major requirements for such a photocathode must be met, as follow:

1) The active layer of the photocathode must provide a high crystalline quality for a long diffusion length of photon-excited electrons in the conduction band of the active layer;

2) The active layer of the photocathode must be either P-type or nearly neutral, with a low dopant level, and with effective negative electron affinity to provide conduction band bending adjacent to the surface of the active layer from which electrons are to escape the active layer;

3) The active layer and a physically supporting layer (i.e., a photon-transmitting window supporting the active layer) must form an interface of low crystalline defects to minimize crystal defects in the active layer and recombination of photon-excited electrons back into the crystal lattice at these defects;

4) The active layer must have a high absorption of photons in the spectral region of interest, with a thin active layer having a thickness about equal to the electron diffusion length of this layer; and 5) The supporting layers, including the photon-transmitting window, must have a high spectral transmission in the spectral band of interest.

Considering the disclosure of the '248 patent it is seen that the active layer is epitaxially grown either directly upon the surface of a sapphire substrate, which substrate forms the photon-transmitting support window for the photocathode, or upon an intervening buffer layer of $Al_yGa_{1-y}N$, with y>x. However, without provision to minimize defects in the crystalline lattice at the interface of the sapphire substrate window with the active layer or at the interface of the active layer with the buffer layer, many of the photon-excited electrons will be trapped in lattice defects and cannot yield photoelectron emissions at the emitting surface of the active layer. The intervening buffer layer of $Al_yGa_{1-y}N$ taught by the '248 patent will not provide an interface either sufficiently low in or significantly free of crystalline defects.

Additionally, activation of the active layer of $Al_xGa_{1-x}N$ with Cs alone is believed to be less advantageous than activation with Cs and $O_2$ together in providing a more stable negative electron affinity electron-emitting surface of the active layer.

SUMMARY OF THE INVENTION

In view of the deficiencies of the related technology, a primary object for this invention is to avoid one or more of these deficiencies.

A further object for this invention is to provide a transmission mode ultraviolet-light sensitive photocathode having an interface between a photon-transmitting supportive window and an active layer of the photocathode, which interface is low in crystalline defects.

Yet another object for this invention is to provide such a photocathode which is activated with a combination of Cs and $O_2$ to provide a negative electron affinity electron emitting surface of the photocathode.

Yet another object for this invention is to provide a manufacturing intermediate product for such a photocathode, in which the manufacturing intermediate product includes a protective layer preventing oxidation of the $Al_xGa_{1-x}N$ active layer during manufacturing of a device including the photocathode.

Another object for this invention is to provide a device using such a manufacturing intermediate product, in which a step in the process of manufacturing the device is effective to remove the protective layer from the manufacturing intermediate product, resulting in a finished photocathode.

Accordingly, the present invention provides according to one aspect, a photocathode for receiving photons of ultraviolet light and responsively emitting photoelectrons, the photocathode comprising a sapphire window substrate layer; a single-crystal active layer of AlGaN carried on the substrate layer; and a crystalline interface layer interposing between the substrate window layer and the active layer and including means for providing an interface between the interface layer and the active layer which is substantially free of crystal lattice defects.

According to another aspect, the present invention provides a method of making a photocathode responsive to photons of ultraviolet light to emit photoelectrons, the method comprising the steps of providing a sapphire window substrate layer; carrying a single-crystal active layer of AlGaN on the substrate layer; interposing a crystalline interface layer between the substrate window layer and the active layer and interfacing with each; and including in the crystalline interface layer means for providing an interface between the interface layer and the active layer which is substantially free of crystal lattice defects.

These and additional objects and advantages of the present invention will be apparent from a reading of the following detailed description of several alternative preferred exemplary embodiments of the invention taken in conjunction with the appended drawing Figures.

BRIEF DESCRIPTION OF THE DRAWING FIGURES

FIG. 1 provides a diagrammatic cross sectional view of a photocathode embodying the present invention;

FIG. 2 provides a spectral response graph of photoelectron emission from a photocathode embodying the invention in comparison to wavelength of light impinging on the photocathode;

FIGS. 3–5 provide more detailed diagrammatic cross sectional views of alternative embodiments of manufacturing intermediate products, each of which is a precursor to a respective photocathode embodying the present invention;

FIG. 6 is a diagrammatic cross sectional view of an electron multiplier tube using a photocathode according to the present invention; and FIGS. 7 and 8 in combination provide a manufacturing process flow chart setting out the steps in the process of making both a photocathode embodying the present invention, and a device using such a photocathode.

DETAILED DESCRIPTION OF THE PREFERRED EXEMPLARY EMBODIMENTS OF THE INVENTION

Figure 1:
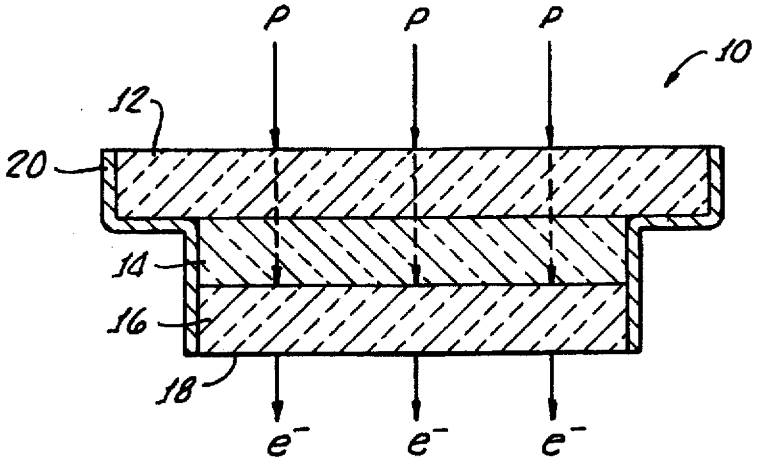

Viewing FIGS. 1–7 in conjunction with one another, and viewing first FIG. 1, an exemplary and highly diagrammatic photocathode 10 is depicted. In overview, this photocathode 10 includes a photon-transparent and supportive window portion 12. As will be seen, the window portion 12 serves to support active portions of the photocathode, to conduct photons of light having wavelengths in a particular band to the active portions of the photocathode 10, and to sealingly close a vacuum enclosure of a product incorporating the photocathode 10. Preferably, the window portion 12 is formed of single-crystalline sapphire ($Al_2O_3$). This window layer is highly transparent to light in the ultraviolet-light wavelength band beyond 150 nm., and up to the middle of the infrared wavelength band. As used herein, the term "light" means electromagnetic radiation, regardless of whether or not this light is visible to the human eye.

Supported by the window portion 12 is an interface layer 14. This interface layer 14 will be further described below. However, it should be noted that the interface layer 14 is also selectively transparent to light in the ultraviolet wavelength band. That is, the interface layer 14 may be selected to have a sharply decreased transparency to uv light shorter than a selected wavelength. Consequently, photons of ultraviolet light in the selected uv wavelength band for the photocathode 10, which are indicated with the arrowed characters "p" on FIG. 1, and which fall upon the window portion 12, pass freely through this window and the interface layer 14.

Carried upon the interface layer 14 is an active layer 16 of material which is either not transparent, or is only semi-transparent, to light in the ultraviolet wavelength band. This active layer 16 is single-crystal in nature, and is absorptive of photons of ultraviolet light in the selected wavelength band to release excited electrons into the crystal matrix of the material. These released electrons diffuse through the material of the active layer 16, and many of these electrons are emitted from the layer 16 at an electron-emitting surface 18 thereof, as is indicated with the arrowed characters "e-" on FIG. 1. As was pointed out above, defects of the crystal lattice in the region between the interface layer 14 and the active layer 16 can provide an increased probability that freed excited electrons will be trapped into the defects in the active layer and will not be emitted by the photocathode. The photocathode 10 includes provisions, which will be further explained below, in order to minimize the population of crystal defects at the interface of the active layer 16 with the interface layer 14 as well as in the active layer 16.

Figure 6:
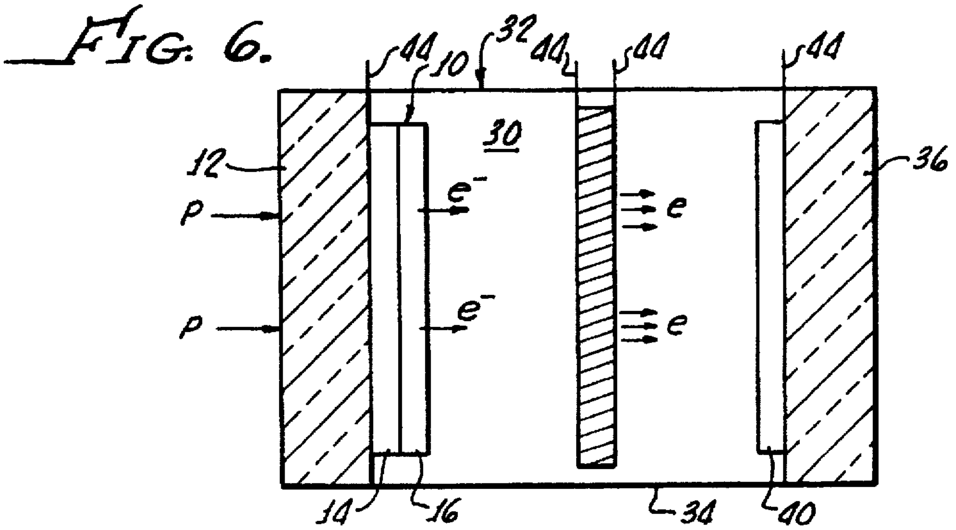

Circumferentially around the photocathode 10 is disposed a metallic conductive electrode 20. This conductive electrode provides for the application to photocathode 10 of a high-voltage potential field. The high-voltage field ensures that photoelectrons emitted from the photocathode 10 are driven away from the surface 18 and to an amplifier device (for example, to a microchannel plate as is seen in FIG. 6, and which is further explained below). As will be explained, the photocathode 10 and an amplifier device may be combined in a device for detecting uv light flux. Also, it should be noted that FIG. 1 is highly diagrammatic. The relative thicknesses of layers 14 and 16 is grossly exaggerated in FIG. 1 for clarity of illustration. In physical reality, these layers 14 and 16 are very thin. This same type of exaggeration in the comparative thicknesses of certain portions of the photocathodes depicted and described herein is continued also in the remaining diagrammatic illustrations also for purposes of clarity of illustration.

Figure 2:
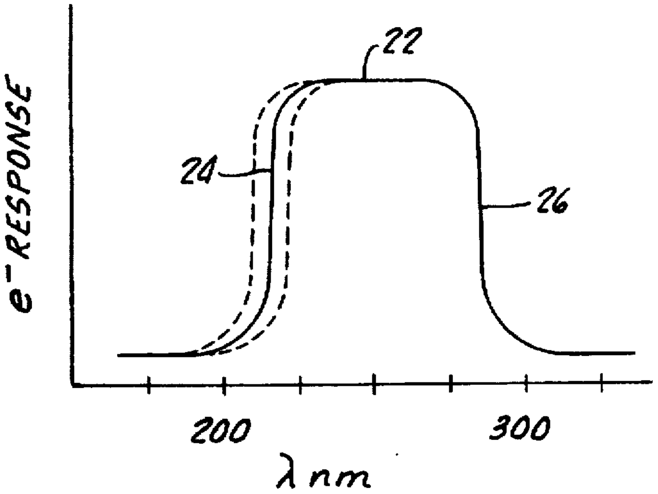

FIG. 2 graphically indicates the photoelectron emitting response of the photocathode 10 as a function of the wavelength of uv light received by this photocathode. Viewing FIG. 2, it is seen that the photocathode 10 has a line 22 of peak spectral uv photoelectron-emitting response rather sharp short-wavelength cutoff of response at about 200 nm. As will be explained, the wavelength at which this short-wavelength cutoff occurs can be tailored for the photocathode 10 by selecting the particular crystalline constituents of a portion of the interface layer 14, as will be further explained. The dashed lines on FIG. 2 adjacent to the solid short-wavelength cutoff line portion (indicated with the numeral 24 indicate that this cutoff line may selectively be shifted along the wavelength spectrum.

Similarly, FIG. 2 shows that the photocathode 10 has a long-wavelength spectral uv photo-electron-emitting response cutoff (indicated at 26 on FIG. 2) which is also sharp. This longer-wavelength response cutoff line 26 can also be selectively positioned along the wavelength spectrum by selecting the crystalline constituents and relative concentrations of these constituents in the active layer 16. Briefly stated, the wavelength for the short-wavelength cutoff line 24 may be selected by choosing an energy band gap for a portion of the interface layer 14, or for the sapphire window 12. The long-wavelength cutoff line may be positioned along the wavelength spectrum by selecting an energy band gap for the active layer 16. This selection of the response band for the photocathode 10 will also be further explained.

Figure 7:
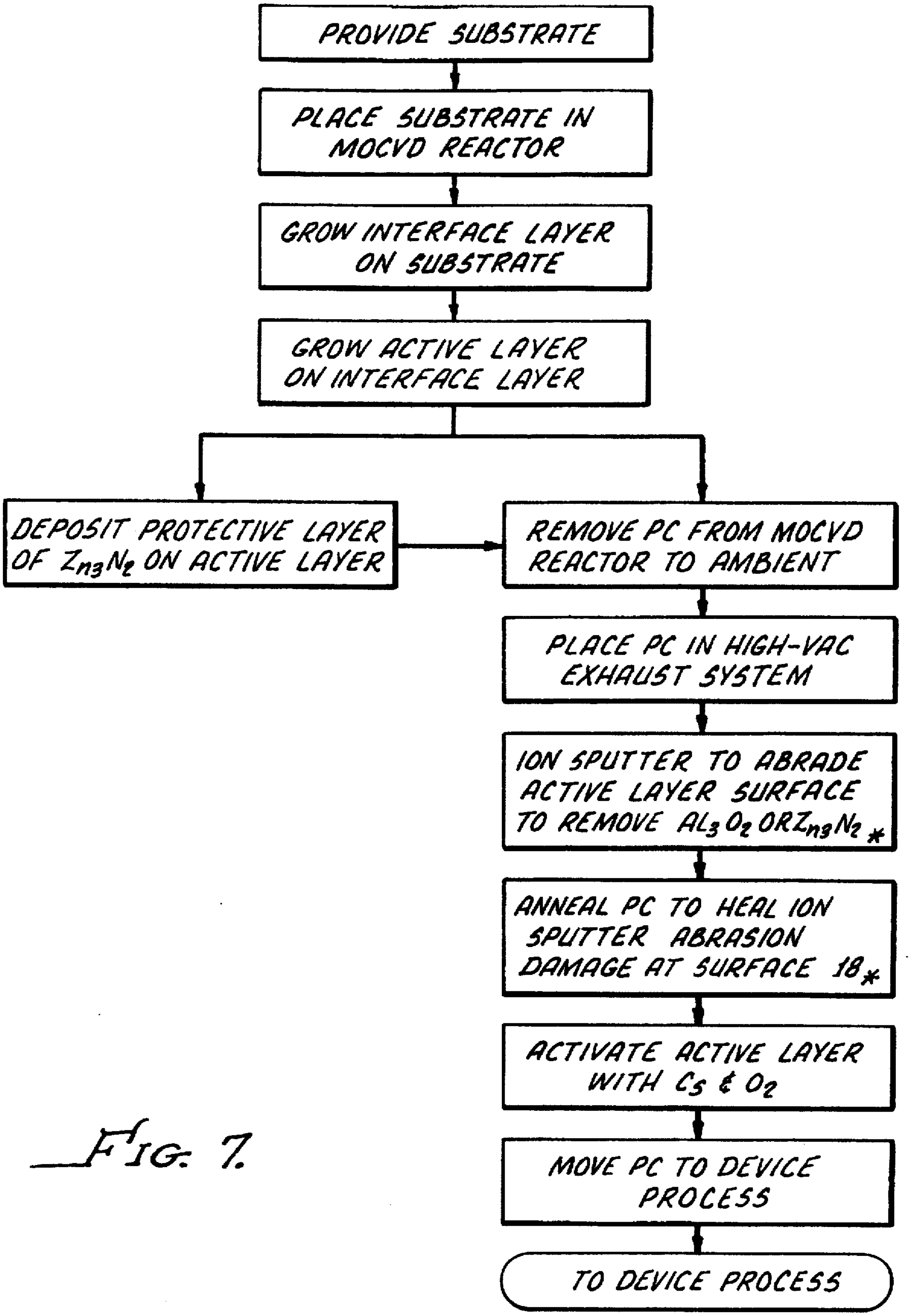
Figure 8:
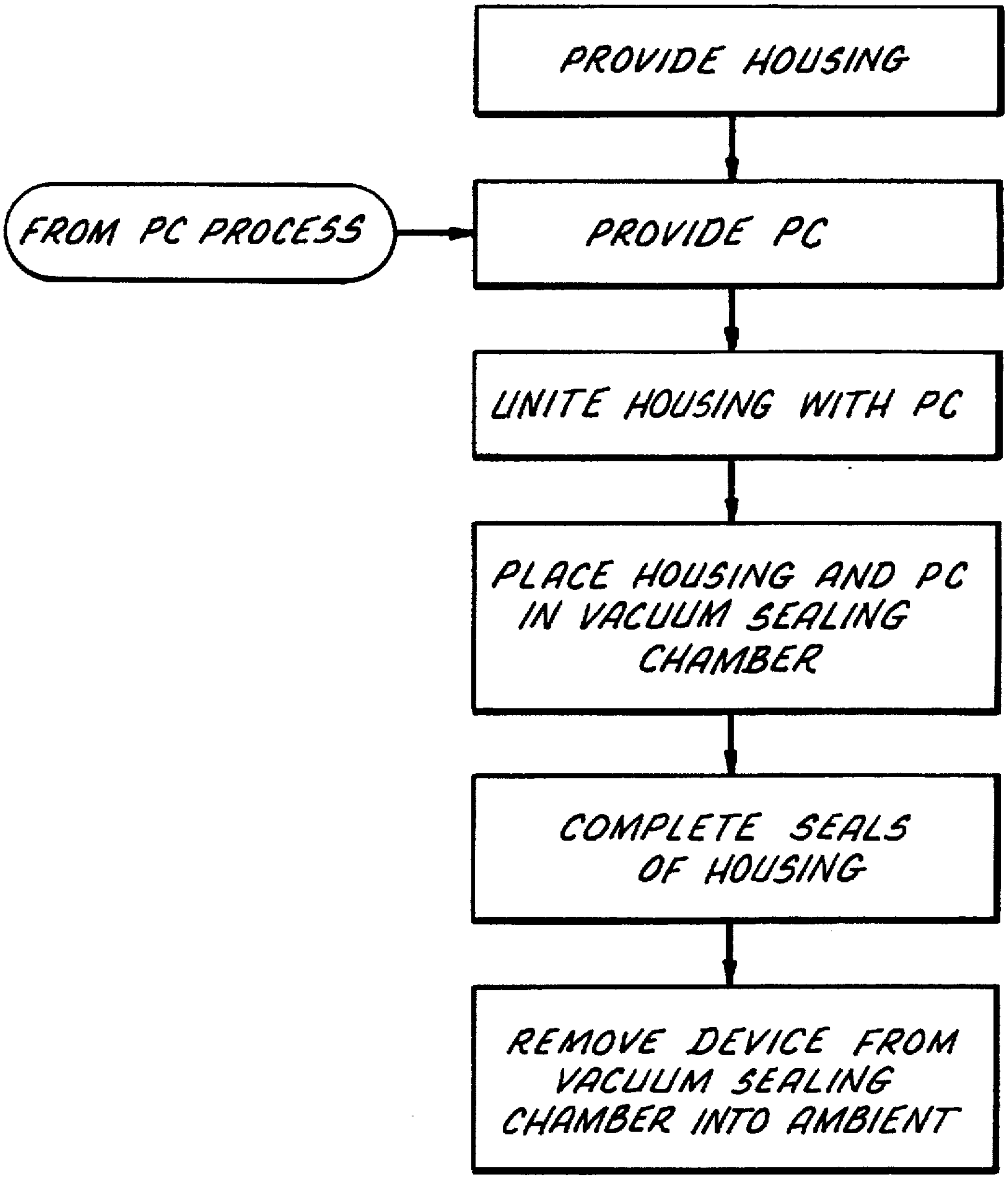

Turning now to FIGS. 3–6, in conjunction with FIG. 7, three manufacturing intermediate products (respectively referenced with the numerals 10', 10", and 10'") for different photocathodes 10 according to the present invention are depicted. Each of these manufacturing intermediate products includes a photocathode 10 without the electrode 20. It will be understood that completion of the photocathodes 10 will include application of the metallic electrodes 20. However, each of the manufacturing intermediate products also includes an environmental protection element which is effective to prevent environmental oxidation of the surface 18 of the active layer 16. As will be further described, during a manufacturing step for a device including a photocathode 10, a step is performed subsequent to the completion of the manufacturing intermediate products in which the environmental protection layer is removed. Consequently, the completed device includes a photocathode 10 without the environmental protection element. It will be seen that once the photocathode 10 is included in the completed device, the device itself provides environmental oxidation protection to the surface 18 of the photocathode 10.

Alternatively, the environmental protection element may be omitted, and an oxide removal and cleaning process (which will be described) may be used to prepare the photocathode 10 for use in a device. Accordingly, consideration of FIG. 7 which presents a manufacturing process flow chart for the photocathode 10 shows a process branching which is dependent upon whether the protective layer or a cleaning and oxide removal step is to be used in the making of a device with a photocathode 10. Those ordinarily skilled in the pertinent arts will recognize that when a protective layer is not used on the surface 18 of photocathode 10, the surface must be protected after cleaning from further environmental oxidation. This protection may be afforded, for example, by moving the photocathode directly from the cleaning and activation operation to a sealing operation for the device. Once the photocathode 10 is united with the device it is protected from oxidation by oxygen in the ambient air. On the other hand, alternative precautions may be taken to protect the surface 18 until the photocathode 10 is united with or enclosed within the protective housing of a device.

Figure 3:
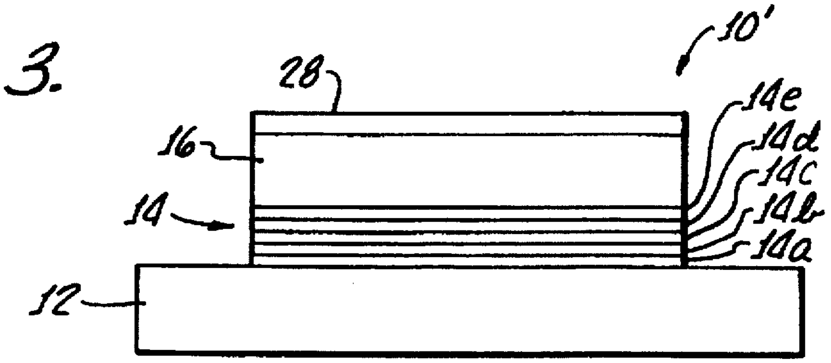

Viewing now FIG. 3, it is seen that the window portion 12 is used as a substrate upon which the interface layer 14 and the active layer 16 are formed during manufacturing of a photocathode 10 according to the invention. The interface layer 14 and active layer 16, as well as the environmental protective layer (indicated with the numeral 28), are formed by metal-organic chemical vapor-phase deposition (MOCVD). That is, the sapphire substrate (which will become the window portion 12) is loaded into a MOCVD reactor and is heated, possibly with radio frequency (rf) induction. Preferably, this sapphire substrate is arranged with the C-plane or M-plane at the surface where interface layer 14 will be applied. The MOCVD process includes using a gas, such as high-purity hydrogen, either as a carrier gas or as a diluent gas for other gases. As a nitrogen source, ammonia or other gases which will supply nitrogen are used. These gases, along with one or more suitable metallic-organic source gases, are controllably fed into the reactor, and result in the epitaxial crystalline growth of the layers 14 and 16 on the substrate 12.

FIG. 3 shows that the interface layer 14 (which is a super lattice structure) itself includes an odd-numbered plurality of sub-layers. These sub-layers are individually indicated on FIG. 3 with the numerals $14_a$, $14_b$, $14_c$, etc., and includes x-valued sub-layers, and y-valued sub-layers, as will be explained. The first of these sub-layers applied to the substrate 12, and each alternate layer thereafter, is a y-valued sub-layer and has a composition represented by the chemical formula, $Al_yGa_{1-y}N$, with the value of y being in the range from 0.85 to 1.0. The second sub-layer in the interface layer 14, and each alternate sub-layer thereafter, is an x-valued sub-layer and has a composition represented by the chemical formula, $Al_xGa_{1-x}N$, with the value of x being selected in the range from about 0.3 to about 0.5. This value for x in the interface layer 14 will be the same value chosen for the active layer 16. Importantly, the interface layer 14 has an odd number of sub-layers with the number of x-valued layers being one less than the number of y-valued sub-layers. The thickness of each of the sub-layers in the interface layer 14 is less than 100 Å. Preferably, the sub-layers of the interface layer 14 each have a thickness in the range from about 40 Å to about 75 Å.

Upon the interface layer 14 is epitaxially grown the active layer 16. This active layer 16 has the composition represented by the chemical formula, $Al_xGa_{1-x}N$, with x being in the range from about 0.3 to about 0.5, and being the same as the x value of the x-valued sub-layers 14*b*, etc., in the interface layer 14. A value of x of about 0.4 places the longer wavelength cutoff 26 for the photocathode 10 at about 300 nm. Other values for x may be used as desired, with increasing x values shifting the cutoff 26 toward the shorter wavelength values.

Upon the surface 18 of active layer 16 is deposited the environmental protection layer 28. This deposition of the layer 28 is accomplished in the same MOCVD reactor without exposure of the work piece to ambient. The layer 28 is formed of $Zn_3N_2$. Upon application of the protective layer 28, the manufacturing intermediate product 10' is completed and may be removed from the protective fabrication environment into the atmosphere. Because of the presence of the protective layer 28, the surface 18 of the active layer 16 is not exposed to environmental oxygen and does not oxidize.

Alternatively, the photocathode 10 may be prepared for use in a device without the use of the protective layer 28. When such a photocathode 10 is removed from the manufacturing environment (i.e., from the MOCVD reactor) into the ambient atmosphere, oxidation of the surface 18 begins at once. These photocathodes 10 will require cleaning the surface 18 of active layer 16 before the photocathode can be used in a device. That is, the surface 18 upon exposure to environmental oxygen, will form a surface oxide, including $Al_2O_3$. This $Al_2O_3$ material is very tough and difficult to remove. The surface oxide would prevent the photocathode from functioning were it not removed.

However, this surface oxide, which includes $Al_2O_3$, can be effectively removed by using a high-vacuum exhaust system in which low-energy ions are sputtered against the surface 18. The ions effectively erode the oxide away. Following this ion-sputter cleaning of the surface 18, the photocathode 10 is annealed in the vacuum exhaust system to heal the surface damage done by the ion bombardment. With photocathodes on which a surface oxide with $Al_2O_3$ is allowed to form and is then removed, the activation of surface 18 with Cs and $O_2$ can be performed in the same vacuum exhaust system after the annealing, and while the surface 18 is still clean. This activation of the photocathode 10 is done prior to subsequent manufacturing steps to combine the photocathode 10 into a device for use.

With a photocathode having the protective coating of $Zn_3N_2$, this coating may first be evaporated away by placing the manufacturing intermediate produce 10', 10", or 10'" in a vacuum exhaust system, and heating the intermediate product. The layer of $Zn_3N_2$ material evaporates and is captured by the vacuum exhaust system. Alternatively, a low-energy ion sputter abrasion step may be used to remove the $Zn_3N_2$ layer. This ion abrasion step is performed with less vigorous ion abrasion conditions than those which are required to remove the surface oxide which includes $Al_2O_3$. That is, although the layer of $Zn_3N_2$ material is effective to prevent a surface oxide from forming, this material is much easier to remove than a surface oxide, and its removal does not cause as much surface damage. Consequently, a heat cleaning operation in the vacuum exhaust system, which also anneals the active layer 16, is sufficient to heal abrasion damage done by this gentle ion bombardment. Following this removal of the environmental protection coating, the surface 18 of active layer 16 is activated with Cs and $O_2$ as described above. In order to prevent environmental contamination of the active layer after this cleaning and activation, the photocathode 10 is transferred directly from the vacuum exhaust system into a device sealing chamber without exposure to ambient air.

Figure 4:
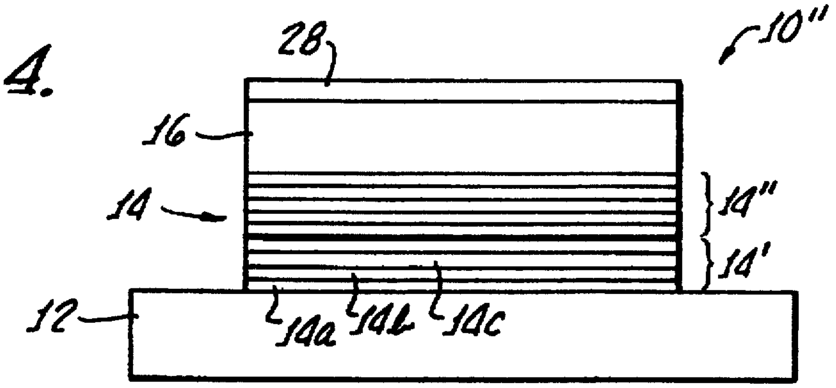
Figure 5:
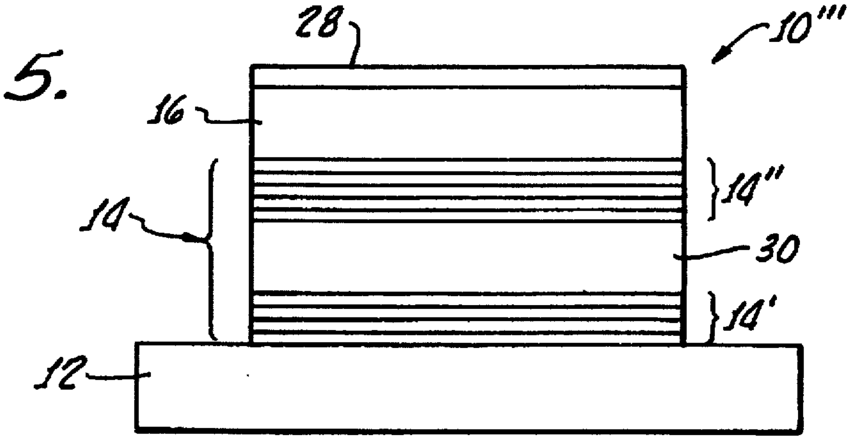

FIGS. 4 and 5 present diagrammatic views of alternative manufacturing intermediate products 10", and 10'", for photocathodes 10. Viewing first FIG. 4, it is seen that the manufacturing intermediate product 10" includes an interface layer 14 which includes two sub-regions 14' and 14". The sub-regions 14' and 14" are in fact distinguishable multi-part layers or sub-layers of the interface layer 14. The interface layer sub-region 14' incudes an odd-numbered plurality of alternating sub-layers 14a, 14b, etc.; the first and each alternate one of the sub-layers having a composition of $Al_yGa_{1-y}N$, with the value of y being in the range from 0.85 to 1.0. The second (14b), and each alternate sub-layer in the sub-region 14' has a composition $Al_zGa_{1-z}N$, with the value of z being selected in the range from about 0.65 to about 0.75.

Similarly, the sub-region 14", which is disposed upon the sub-region 14', has an odd-numbered plurality of sub-layers which are alternatingly of composition $Al_zGa_{1-z}N$ (with the value of z being in the range from 0.65 to 0.75); and of composition $Al_xGa_{1-x}N$ (with the value of x being selected in the range from about 0.3 to about 0.5, and being the same value chosen for the active layer 16). The thickness for each of the sub-layers of the interface layer 14 is less than about 100 Å, with a preferred thickness for each sub-layer being in the range from about 40 Å to about 75 Å.

This gradation of the ratio of Al to Ga in the interface layer 14 from the substrate 12 toward the active layer 16 is believed to further assist in transitioning from the crystal lattice spacing of the sapphire substrate to the crystal lattice spacing of the active layer 16. Consequently, crystal lattice defects or slippage planes do not propagate through the plural crystal lattice layers, and plural crystal lattice layer transitions of the interface layer 14, to the interface between the layer 14 and the active layer 16. Because the interface of layer 14 with active layer 16 has a low population of crystal defects, the number of defects propagated into the active layer 16 is low. Accordingly, the active layer 16 is low in crystal defects, and the excited electrons released into the conduction band of the material of this active layer 16 are more likely to diffuse completely through the active layer to the surface 18 without being trapped by a crystal defect. Such trapping or recombination of free excited electrons back into the crystal lattice reduces the electron-emitting response of a photocathode. Because the photocathode 10 is low in crystal defects in the active layer 16, its electron-emitting response is improved.

Viewing FIG. 5, it is seen that the manufacturing intermediate product 10'" includes an interface layer 14 which includes two sub-regions 14' and 14" like the intermediate product of FIG. 4. However, this product 10' also includes as part of the interface layer 14, a filter layer 30. The filter layer 30 is interposed between the sub-regions 14' and 14" of the interface layer 14. Filter layer 30 is comparatively thick, with a thickness in the range from less than about 1000 Å to about 5000 Å. Filter layer 30 has a composition $Al_zGa_{1-z}N$, with the value of z being in the range from 0.65 to 0.75. Importantly, the value of z for the filter layer 30 is the same as the value of z for the sub-region 14" of the interface layer. Further, the value of z is selected so that the conductance band gap of the filter layer 30 allows this layer to be transparent to uv light above a selected wavelength, and substantially opaque to shorter wavelength light. As was pointed out above, the short-wavelength cutoff 26 of the photocathode 10 may be tailored by selection of a portion of the interface layer. The filter layer 30 having the composition $Al_zGa_{1-z}N$, and the sub-layers of the sub-region 14" having this same composition $Al_zGa_{1-z}N$, cooperatively are the portion of the interface layer which is tailored to selectively position the short-wavelength cutoff 26 along the uv spectral band, recalling FIG. 2.

Viewing now FIG. 6, a device 32 having as part of 3its structure a photocathode 10 is depicted. The device 2 may be, for example, an image intensifier tube which provides a visible image of a scene illuminated with or including a radiant source of uv light. Alternatively, the device 32 may be a photomultiplier tube, which provides an electrical output indicative of and proportionate to a flux of uv light. The device 32 is further explained with reference to its use as a photomultiplier tube. Device 32 includes a tubular body 34, which is closed at one end by the photocathode 10. Specifically, the electrode portion 20 of the photocathode 10 may be sealed to the body 34, for example. At the opposite end, the body 34 includes an end wall 36 also sealingly attached to the remainder of body 34, and cooperating therewith to define an evacuated chamber 38. The end wall 36 internally of chamber 38 carries an anode electrode 40.

Between the photocathode 10 and the electrode 40 is disposed a microchannel plate 42. This microchannel plate is effectively an electron amplifier. Individual high-voltage electrical leads 44, which are insulated from one another, connect with the electrode 20 of the photocathode 10, to the opposite faces of the microchannel plate 42, and to the electrode 40. A high-voltage potential field is applied to these electrical leads 44, with the photocathode 10 being the most negative and the electrode 40 the most positive. The voltage differential between the photocathode 10 and electrode 40 may be several thousand volts.

Consequently, when the photocathode 10 is exposed to a flux of uv light, indicated with the arrows "p", the emitted photoelectrons (arrows "e-") travel to the microchannel plate 42 under the effect of the applied potential field. Microchannel plate 42 receives the photoelectrons e-, and responsively releases a shower of secondary-emission electrons (indicated with the arrow "e", on FIG. 6) proportionate in number to the photoelectrons. The secondary emission electrons travel to and impinge upon the electrode 40 to produce a current flow from this electrode. The current flow from electrode 40 is proportionate to the flux of uv light incident upon the photocathode 10.

During manufacture of the device 32, the housing 34 is assembled using vacuum sealing techniques. This assembly step sealingly unites the photocathode 10 with the housing body 34. During this vacuum seal operation, the environment surrounding the device 32 is of ultra-high vacuum (i.e., very low pressure). As was pointed out above, the layer 28 of environmental-protection material is first removed by placing the photocathode manufacturing intermediate product 10', 10", or 10'" into a vacuum exhaust system. In this system, the layer 28 is removed, and the surface 18 is sensitized and activated with application of Cs and $O_2$. The photocathode is than moved from the vacuum exhaust system into a vacuum sealing chamber without exposure to ambient air. In the vacuum sealing chamber, the photocathode 10 is united with the housing of the device to form a seal. After the seals of the device are complete (i.e., the housing 34 is complete), the seals of the device housing exclude ambient air from the chamber 38 and retain a high vacuum level within this chamber. Consequently, the active layer 16 does not oxidize in the device.

Turning now to FIG. 7, a manufacturing flow chart listing the steps in the process of making a device with a photocathode (PC) 10 are set out. This flow chart includes the steps in the process of making a photocathode 10 itself. As mentioned, the flow chart for making the photocathode 10 includes a branch dependent upon whether only the photocathode 10, or the manufacturing intermediate product which includes an oxidation-protective coating 28, is made for further use in the process of making the device 32. In the event that the PC process includes the branch step applying the layer 28 of environmental-protection material ($Zn_3N_2$), then the steps marked with an asterisk (*) will be performed under different conditions. That is, if the protective layer 28 is used, then ion abrasion of the surface 18 to remove $Al_2O_3$, and annealing to heal the surface damage resulting from this abrasion, will not be required. However, these steps will still be performed to remove the protective layer 28 of $Zn_3N_2$, and to heal any abrasion of the active layer 16 at surface 18 resulting from the ion bombardment. In either case, whether a more vigorous ion bombardment is performed to remove the layer of $Al_2O_3$, or a more gentle ion bombardment is performed to remove the protective layer 28 of $Zn_3N_2$, this ion bombardment is preferably performed using ions of nitrogen gas rather than the more conventional argon ion bombardment. Nitrogen ions are preferable for use in abrading the surface oxide or protective zinc nitride layer from the active layer 16 because nitrogen is a constituent of the AlGaN material. As a result, the active material is not contaminated with argon atoms incorporated into the crystal lattice, and nitrogen atoms so incorporated are not foreign to the chemical contents of the crystal AlGaN material.

Regardless of which product (10 or 10') is provided to the process for making the device, the vacuum sealing operation of this process will result in an evacuated chamber (compared to ambient pressure) within the device to which the electron-emitting surface 18 of the photocathode 10 is exposed. This surface 18 is activated by application of Cs and $O_2$, but is be free of surface oxides, and of $Al_2O_3$ in particular, either because a protective $Zn_3N_2$ layer has prevented its formation, or because the surface oxide, which would include such $Al_2O_3$, and which results from ambient atmospheric exposure of the surface 18, has been removed. Completion of the device results in removal of the protective layer of $Zn_3N_2$ under conditions insuring that atmospheric oxidation of the surface 18 cannot occur, and will be prevented thereafter.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A method of making a photocathode responsive to photons of ultraviolet light to emit photoelectrons, said method comprising the steps of:

providing a sapphire window substrate layer which may include multiple crystal lattice defects exposed at a surface of said substrate layer;

growing a single-crystal active layer of AlGaN over said surface of said substrate layer;

growing a crystalline interface layer between said substrate window layer and said active layer and interfacing with each in order to substantially prevent crystal lattice defects of said substrate layer propagating through said interface layer during growing thereof and into said active layer during growing thereof;

including in said crystalline interface layer means for providing an interface between said interface layer and said active layer which is substantially free of crystal lattice defects; and including in said means for providing said interface which is substantially free of crystal lattice defects a super lattice structure with plural sub-layers of AlGaN, and alternating respective compositions of aluminum and gallium constituents of said plural sub-layers of said super lattice structure.

2. A method of making a photocathode responsive to photons of ultraviolet light to emit photoelectrons, said method comprising the steps of:

providing a sapphire window substrate layer;

growing a single-crystal active layer of AlGaN on said substrate layer;

interposing a crystalline interface layer between said substrate window layer and said active layer and interfacing with each;

including in said crystalline interface layer means for providing an interface between said interface layer and said active layer which is substantially free of crystal lattice defects;

including the step of providing said active layer with a composition represented by the chemical formula $Al_xGa_{1-x}N$;

providing said interface layer also with a layer of AlGaN material having a composition represented by the chemical formula $Al_xGa_{1-x}N$; and making the quantity "x" in each formula substantially the same value;

providing said interface layer with a layer of AlGaN material which has a composition represented by the chemical formula $Al_yGa_{1-y}N$;

making the value of the quantity "y" greater than the value of the quantity "x";

providing said interface layer of AlGaN with both a layer of AlGaN material which has a composition represented by the chemical formula $Al_yGa_{1-y}N$, with the value of the quantity "y" being larger than the value of the quantity "x"; and also with a layer of AlGaN material having a composition represented by the formula $Al_zGa_{1-z}N$, with the value for the quantity "z" being between the values for the quantities "x" and "y"; and further including the steps of:

providing said interface layer of AlGaN material both with a first region adjacent to said substrate layer, and with a second region adjacent to said active layer;

providing each of said first region and said second region with an odd number of sub-layers of AlGaN material of alternating compositions;

configuring said first region to include alternating sub-layers of AlGaN material having respective compositions of $Al_zGa_{1-z}N$, and $Al_yGa_{1-y}N$;

configuring said second region to include alternating sub-layers of AlGaN material having respective compositions of $Al_xGa_{1-x}N$, and $Al_zGa_{1-z}$; and setting the value of the quantity "z" to a value in the range between the values for the quantities "x" and "y".

3. A method of making a photocathode responsive to photons of ultraviolet light to emit photoelectrons, said method comprising the steps of:

providing a sapphire window substrate layer;

growing a single-crystal active layer of AlGaN on said substrate layer;

interposing a crystalline interface layer between said substrate window layer and said active layer and interfacing with each;

including in said crystalline interface layer means for providing an interface between said interface layer and said active layer which is substantially free of crystal lattice defects; and providing a layer of environmental-protection material including $Zn_3N_2$ disposed upon said single-crystal active layer of AlGaN.

4. A method of making a photocathode responsive to photons of ultraviolet light to emit photoelectrons, said method comprising the steps of:

providing a sapphire window substrate layer;

growing a single-crystal active layer of AlGaN on said substrate layer;

interposing a crystalline interface layer between said substrate window layer and said active layer and interfacing with each;

including in said crystalline interface layer means for providing an interface between said interface layer and said active layer which is substantially free of crystal lattice defects; and using ions of nitrogen gas to abrade a surface oxide from said active layer of AlGaN.

5. A method of making a photocathode responsive to photons of ultraviolet light to emit photoelectrons, said method comprising the steps of:

providing a sapphire window substrate layer; growing a single-crystal active layer of AlGaN on said substrate layer;

interposing a crystalline interface layer between said substrate window layer and said active layer and interfacing with each; and including in said crystalline interface layer means for providing an interface between said interface layer and said active layer which is substantially free of crystal lattice defects; and further including the steps of:

disposing said photocathode in a vacuum exhaust system, using said vacuum exhaust system to apply heat and vacuum to an active surface of said active layer, bombarding said active surface with low-energy ions to abrade said surface sufficiently to substantially remove surface oxides including $Al_2O_3$ formed on said surface, and annealing said active surface to heal ion abrasion damage thereto.

6. The method of making a photocathode according to claim 1 further including the steps of providing said active layer with a composition represented by the chemical formula $Al_xGa_{1-x}N$; and providing said interface layer also with a layer of AlGaN material having a composition represented by the chemical formula $Al_xGa_{1-x}N$; and making the quantity "x" in each formula substantially the same value.

7. The method of making a photocathode according to claim 6 further including the steps of providing said interface layer with a layer of AlGaN material which has a composition represented by the chemical formula $Al_yGa_{1-y}N$; and making the value of the quantity "y" greater than the value of the quantity "x".

8. The method of making a photocathode according to claim 1 further including the steps of providing said interface layer with plural layers of AlGaN material each having a composition represented by the chemical formula $Al_yGa_{1-y}N$; alternating said plural layers of AlGaN material with said composition of $Al_yGa_{1-y}N$ with at least one layer of AlGaN material having the composition $Al_xGa_{1-x}N$.

9. The method of making a photocathode according to claim 8 further including the steps of configuring said interface layer so that said plural layers of AlGaN having the composition $Al_yGa_{1-y}N$ includes a layer of this material disposed in contact with said substrate layer and another layer of this material disposed in contact with said active layer.

10. The method of making a photocathode according to claim 7 further including the step of selecting said layer of AlGaN material which has a composition represented by the chemical formula $Al_yGa_{1-y}N$, to have a value for the quantity "y" in the range from 0.85 to 1.0.

11. The method of making a photocathode according to claim 7 further including the steps of providing said interface layer of AlGaN with both a layer of AlGaN material which has a composition represented by the chemical formula $Al_yGa_{1-y}N$, with the value of the quantity "y" being larger than the value of the quantity "x"; and also with a layer of AlGaN material having a composition represented by the formula $Al_zGa_{1-z}N$, with the value for the quantity "z" being between the values for the quantities "x" and "y".

12. The method of making a photocathode according to claim 11 further including the step of setting said quantity "z" to a value in the range of 0.65 to 0.75.

13. The method of making a photocathode according to claim 6 further including the step of selecting said "x" quantity to have a value in the range from about 0.3 to about 0.5.

14. The method of making a photocathode according to claim 1 further including the steps of providing said active layer with an electron-emitting surface; and depositing onto said electron-emitting surface both Cs and $O_2$.

15. The method of making a photocathode according to claim 14 further including the steps of utilizing said Cs and $O_2$ deposited onto said electron-emitting surface of said active layer to effect a negative electron affinity surface, and utilizing said negative electron affinity surface to facilitate escape of electrons from said active layer into free space via said electron-emitting surface.

16. The method of making a photocathode according to claim 15 further including the step of providing said quantity "z" with a value in the range of 0.65 to 0.75.

17. The method of making a photocathode according to claim 15 further including the step of configuring said photocathode so that said first region and said second region interface with one another.

18. The method of making a photocathode according to claim 15 further including the step of configuring said photocathode to include a filter layer of AlGaN material interposed between said first region and said second region.

19. The method of making a photocathode according to claim 18 further including the step of providing said filter layer of AlGaN material with a composition represented by the chemical formula $Al_zGa_{1-z}N$.

20. The method of making a photocathode according to claim 19 further including the step of providing said filter layer of AlGaN with a value of the quantity "z" which is substantially the same as the value of the quantity "z" for said second region of said interface layer.

21. The method of making a photocathode according to claim 3 further including the step of using ions of nitrogen gas to abrade said $Zn_3N_2$ material from said active layer of AlGaN.

22. A photocathode manufacturing intermediate article comprising:

a substrate layer;

an active layer carried upon said substrate layer, said active layer including material responsive to photons of light in a certain wavelength band to release photoelectrons; and a layer of zinc nitride ($Zn_3N_2$) material upon said active layer and substantially preventing formation of surface oxides upon ambient exposure of said manufacturing intermediate article.

23. The manufacturing intermediate article of claim 22 wherein said active layer includes a layer of single-crystal AlGaN material.

24. The manufacturing intermediate article of claim 23 wherein said active layer AlGaN material has a chemical composition represented by the formula $Al_xGa_{1-x}N$, with the value of the quantity "x" bring in the range from 0.3 to 0.5.

25. The manufacturing intermediate article of claim 24 wherein said article further includes an interface layer of material interposed between said active layer and said substrate.

26. The manufacturing intermediate article of claim 25 wherein said interface layer includes a super lattice structure with plural layers of AlGaN.

27. The manufacturing intermediate article of claim 26 wherein said interface layer super lattice structure includes plural alternating layers of AlGaN material, with said alternating layers having respective chemical compositions represented by the formulae $Al_xGa_{1-x}N$, and $Al_yGa_{1-y}N$, with the quantity "x" being the same as for said active layer of AlGaN material, and the quantity "y" having a value selected in the range from 0.85 to 1.0.

28. The manufacturing intermediate article of claim 26 wherein said interface layer super lattice structure includes plural alternating layers of AlGaN material, with a first region of said super lattice structure having alternating sub-layers having compositions of $Al_yGa_{1-y}N$ and $Al_zGa_{1-z}N$; and a second region of said super lattice structure having alternating sub-layers of AlGaN material having compositions of $Al_xGa_{1-x}N$ and $Al_zGa_{1-z}N$; with the quantity "x" being the same as for said active layer of AlGaN material, the quantity "y" having a value selected in the range from 0.85 to 1.0, and the quantity "z" having a value selected in the range from 0.65 to 0.75.

29. The manufacturing intermediate article of claim 28 further including a filter layer of AlGaN material interposed between said first region and said second region of said super lattice structure.

30. The manufacturing intermediate article of claim 29 wherein said filter layer of AlGaN material has a composition represented by the chemical formula $Al_zGa_{1-z}N$.

* * * * *